(12) United States Patent
Glazebrook

(10) Patent No.: US 8,733,413 B2
(45) Date of Patent: May 27, 2014

(54) RUNFLAT

(75) Inventor: Anthony Mitchell Glazebrook, Bangkok (TH)

(73) Assignee: Tyron International Limited, Jersey (GB)

( * ) Notice: Subject to any disclaimer, the term of this patent is extended or adjusted under 35 U.S.C. 154(b) by 45 days.

(21) Appl. No.: 12/734,949

(22) PCT Filed: Jul. 24, 2009

(86) PCT No.: PCT/GB2009/001843
§ 371 (c)(1),
(2), (4) Date: Jun. 3, 2010

(87) PCT Pub. No.: WO2010/020744
PCT Pub. Date: Feb. 25, 2010

(65) Prior Publication Data
US 2011/0126954 A1 Jun. 2, 2011

(30) Foreign Application Priority Data
Aug. 21, 2008 (GB) .................................. 0815310.8

(51) Int. Cl.
*B60C 17/00* (2006.01)
*B60C 17/04* (2006.01)

(52) U.S. Cl.
USPC ........... 152/516; 152/152; 152/155; 152/157; 152/158; 152/520

(58) Field of Classification Search
None
See application file for complete search history.

(56) References Cited

U.S. PATENT DOCUMENTS

| 2,989,108 | A | | 6/1961 | Gore | 152/158 |
|---|---|---|---|---|---|
| 3,976,114 | A | | 8/1976 | Patecell | 152/158 |
| 4,573,509 | A | * | 3/1986 | Smith et al. | 152/158 |
| RE32,693 | E | * | 6/1988 | Winfield | 152/158 |
| 5,141,039 | A | * | 8/1992 | Tansei et al. | 152/158 |
| 5,186,771 | A | * | 2/1993 | Carpentier et al. | 152/158 |
| 2001/0047842 | A1 | | 12/2001 | Gregory | 152/520 |

FOREIGN PATENT DOCUMENTS

| CN | 101112851 | * | 1/2008 |
|---|---|---|---|
| EP | 0 104 977 A1 | | 4/1984 |
| GB | 2 000 733 A | | 1/1979 |
| GB | 2024249 | * | 1/1980 |
| GB | 2191453 | * | 12/1987 |
| WO | WO 2008/115223 | * | 9/2008 |

* cited by examiner

*Primary Examiner* — Justin Fischer
(74) *Attorney, Agent, or Firm* — Harrington & Smith

(57) ABSTRACT

A runflat assembly including a plurality of arcuate components interconnectable to fit around a vehicle wheel. Each component includes a rubber body with a steel support member located within the body, which when mounted on a wheel defines a support ring around the wheel.

19 Claims, 8 Drawing Sheets

RUNFLAT

This invention concerns improvements in or relating to runflat assemblies, and also wheel assemblies incorporating such runflat assemblies.

In a number of instances runflat assemblies are provided for vehicle wheels. Such assemblies generally comprise an annular ring which fits around a wheel inside of the tyre. This blocks off the well of the wheel where provided, and also provides a ground engaging surface around the wheel, upon which surface a vehicle can run in the event of deflation of a tyre.

Previous runflat assemblies have often used a substantially rigid annular member made for instance of a composite material. Such materials are used to provide sufficient strength and wear resistance during use. However, such ground engaging members tend to provide a very hard ride. Moreover, such members, as well as the wheel and suspension of the vehicle on which the assembly is fitted, can be damaged upon application of a high impact force thereagainst. Such forces could be encountered when engaging or mounting a kerb, or driving off road for example.

According to the present invention there is provided a runflat assembly, the assembly comprising a plurality of arcuate section parts interconnectable together into an annular configuration to fit around a vehicle wheel, each part including a body of a resilient material, with a substantially rigid support member extending within the body.

The support member may extend in an arcuate manner within the body, such that when mounted on a wheel the support member in the arcuate parts defines a support ring around the wheel.

A connecting arrangement may be provided on each end of the arcuate parts to permit interconnection to other arcuate parts.

The connecting arrangements may include overlapping connecting members on each part, with a connecting member on one end of each part overlapping on an opposite side to the connecting member on the other end of each part.

Each connecting member may have a part circular end, which may locate substantially against a recess in an adjacent part which has a part circular end such that the connecting members can be pivoted relative to each other.

A fastening means may be extendable through the connecting members to hold the two parts together. Alignable holes may be provided in overlapping connecting members, through which holes the fastening means can extend. The alignable holes may be substantially coaxial with the part circular ends of the connecting members and recesses.

The fastening means may include a nut and bolt. The fastening means may include a sleeve member with a through passage which extends through the alignable holes and may include a washer. The washer may be locatable in the sleeve member through passage. The washer and sleeve member through passage may be frusto conical with respective contact surfaces. The bolt may be extendable through a passage in the washer.

The support members may extend into the connecting arrangements.

Alignable holes may be provided in the support member in each part. The support member may have a connecting form at each end such that at their ends the support members on adjacent parts overlap each other.

The support member may be in the form of a substantially annular ring. One or more circumferential flanges may be provided on the ring, and the ring may have a substantially I shaped cross section. A central part of the support member in each arcuate part may be of reduced radial extent relative to the support member at end parts of the arcuate part, and said central part of the support member may have an inner circumferential flange and may have an outer circumferential flange.

One or more cutouts may be provided in the support member to provide weight reduction.

The support member may be made of steel, Kevlar or carbon fibre.

The assembly body may be of rubber, and may be of natural rubber or polyurethane. The assembly body may be any of M049, M059 or C779 rubber compound or a combination of any thereof.

Different parts of the assembly body may be different rubber compounds.

Recesses may be provided extending into the body to provide weight reduction.

The assembly body may include a flame retardant.

A lubricating material may be provided on the circumferential outer surface of the assembly and/or on the connections between the interconnectable parts. The lubricating material may be such that in normal operation of a wheel incorporating the assembly the material will be solid, but when a tyre or the ground contacts the assembly due to deflation of the tyre, and/or the temperature rises, the lubricant will tend to liquify.

In a first embodiment the assembly comprises two interconnectable parts, whilst in a second embodiment the assembly includes three interconnectable parts.

The invention further provides a wheel assembly, the assembly comprising a wheel, a runflat assembly according to any of the preceding eighteen paragraphs mounted around the wheel, and a tyre mounted around the runflat assembly.

The tyre may be mounted such that an interior surface of the tyre engages with the runflat assembly.

The invention yet further provides a fastening means, the fastening means including a nut, a bolt, a sleeve member with a through passage and a washer, the washer and sleeve member through passage being frusto conical with respective contact surfaces, with the bolt extending through a passage in the washer.

Embodiments of the present invention will now be described by way of example only and with reference to the accompanying drawings, in which: —

Figure 1:
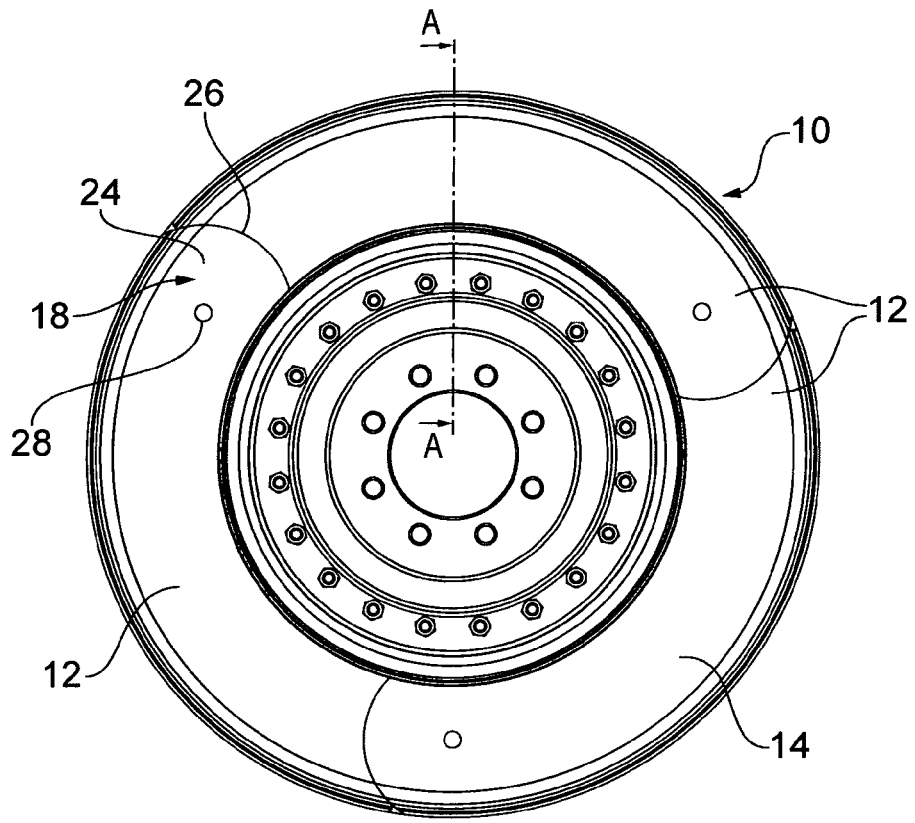
FIG. 1 is a diagrammatic side view of a runflat assembly according to the invention mounted on a wheel.

FIGS. 1 to 7 show a runflat assembly 10 which comprises three interconnectable components 12. Each component 12 includes a rubber body 14 made of C779 rubber compound. Located within the body 14 is a steel support member 16.

Each component 12 defines a 120° arc and has a connection arrangement 18 at each end. The arrangement 18 includes on one side a recess 20 extending for substantially half the thickness of the body 14, with an arcuate inner end 22.

The opposite side of the body 14 to the recess 20 is in the form of a connection web 24 which is locatable in the recess 20 in the body of an adjacent component 12. The web 24 has an arcuate end 26 corresponding to the end 22 of the recess 20. Each component 12 has a recess 20 on each end on opposite sides of the body 14 and correspondingly webs 24 on the other opposite sides at each end of the body 14. Alignable holes 28 are provided through the recesses 20 and webs 24, with the holes 28 being axial with the arcuate ends 22, 26.

Figure 2:
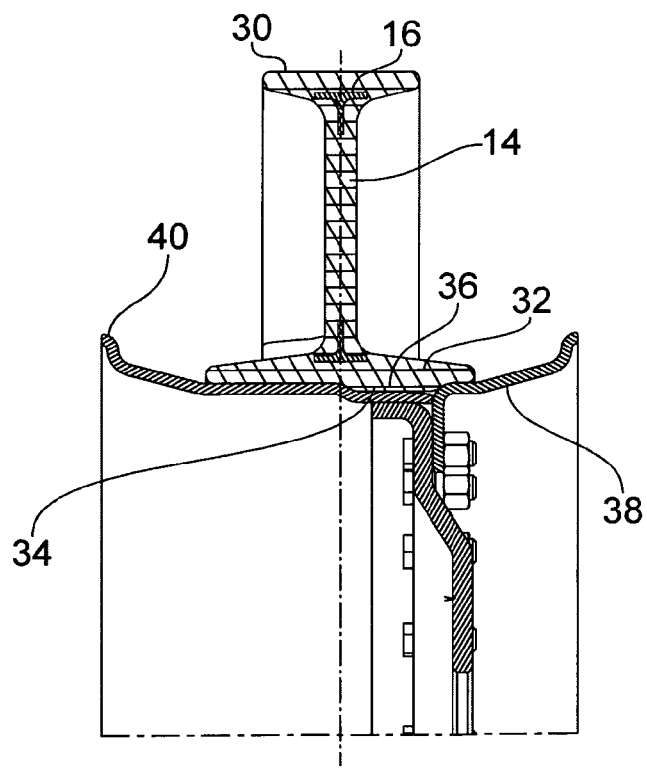
FIG. 2 is a diagrammatic sectional view along the line A to A of FIG. 1.
Figure 3:
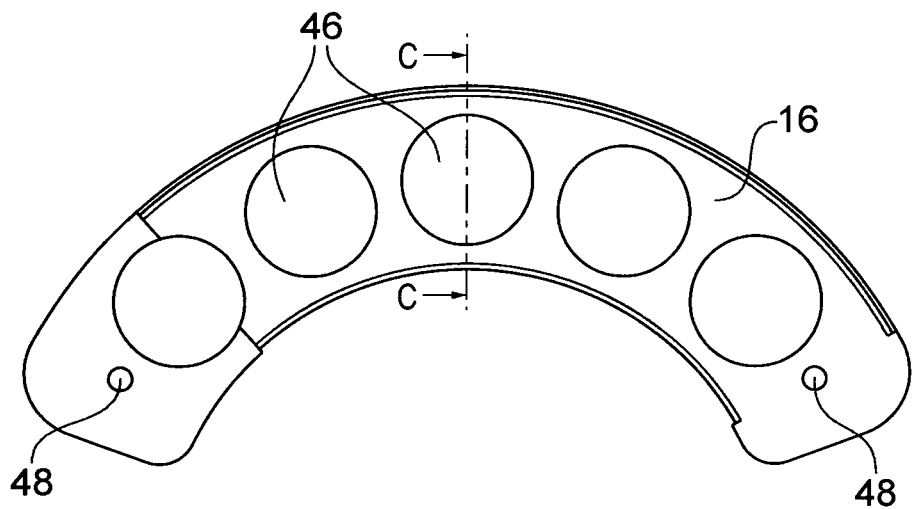
FIG. 3 is a diagrammatic side view of a component of the assembly of FIG. 1.
Figure 4:
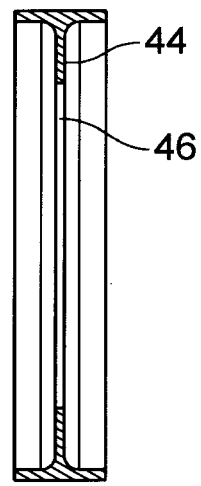
FIG. 4 is a diagrammatic sectional view along the line C to C of FIG. 3.
Figure 5:
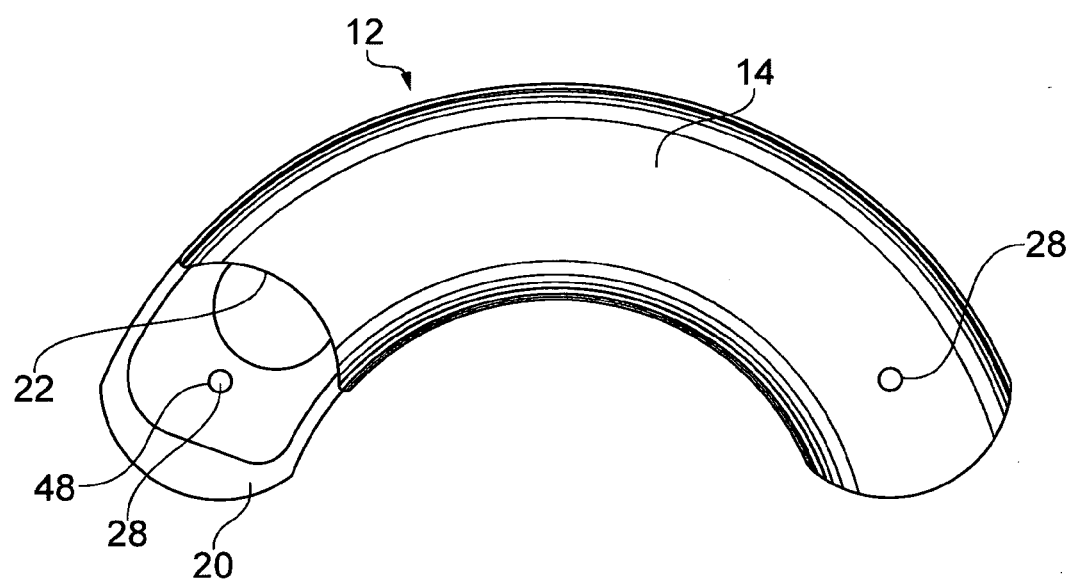
FIG. 5 is a diagrammatic side view of a part of the assembly of FIG. 1.
Figure 6:
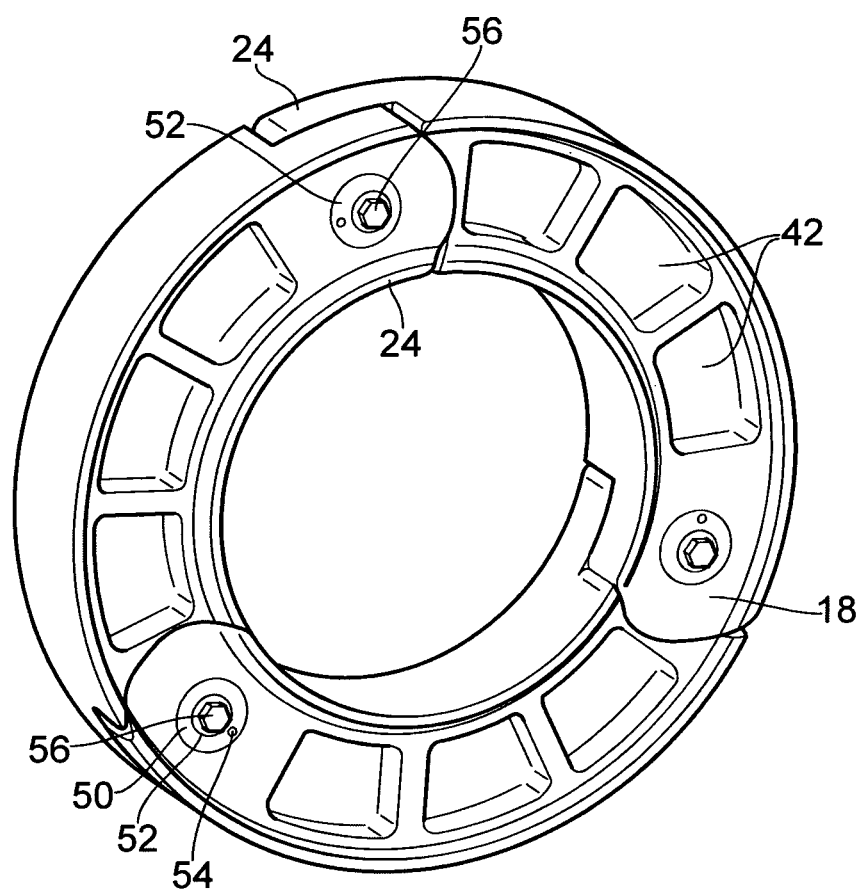
FIG. 6 is a diagrammatic perspective view of the assembly of FIG. 1.
Figure 7:
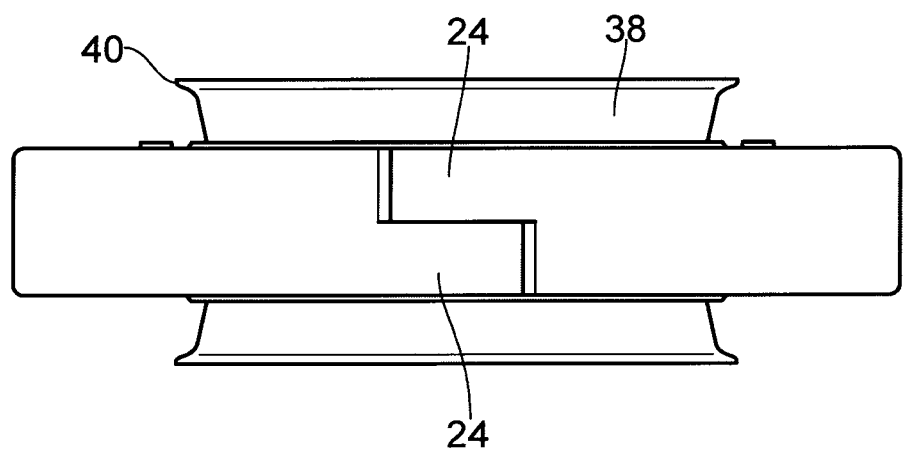
FIG. 7 is circumferential view of the assembly of FIG. 1 mounted on a wheel.

The body 14 has a generally annular configuration with an external circumferential surface 30, but an enlarged internal flange 32. A circumferential projection 34 is provided on one side of the internal flange 32 which locates in a slot 36 in a wheel body 38 as shown in FIG. 2. A tyre (not shown) would fit on the wheel body 38 around the assembly 10, with edges of the tyre engaging with the wheel rims 40. A plurality of recesses 42 are provided in the sides of the body 14 to provide a weight saving.

The support member 16 is in the form of an annular I section beam 44 which is located wholly within the body 14 with radial ends of the beam 44 spaced respectively from the external surface 30 and internal flange 32. A plurality of openings 46 are provided through the beam 44 to provide a weight saving. Holes 48 are provided at each end of the parts of the support member 16, which align with the holes 28 such that the parts of the support member 16 are also interconnected when the components 12 are interconnected. Formations may be provided on the ends of the beam 44 to provide for a flush overlap of the parts of the support member 16.

In use the components 12 of the assembly are located on a wheel body 38 and fastening means 50 are inserted through the respective holes 28, 48. The fastening means may include washers 52 on each side of the body 14, which washers 52 may be offset, and mountable by a hole 54 to the body 14 to prevent rotation thereof. Bolts 56 extend through the holes 28, 48 and engage with nuts (not shown). The nuts may include a sleeve 58 which lines the holes 28, 48.

The washers 52 may include a generally inwardly tapered contact surface 76, which, when assembled between the sleeve 58 and the bolt 56, contacts with a correspondingly inwardly tapered contact surface 78 of the sleeve 58. The tapered contact surfaces 76, 78, ensure that the load on the connection is spread over a greater area than in a conventional arrangement.

The rubber body 14 may include a flame retardant to prevent burning thereof during use when high temperatures can be encountered due to the friction of a deflated tyre with the ground and/or the wheel body 38. A lubricating material may be provided on the external surface 30 and/or at the connections between the components 12. The lubricating material may be in the form of a solid such as a wax, which can liquify when a tyre or the ground engages therewith, and/or the temperature rises due for instance to friction, to provide lubrication.

Due to the resilience of the rubber, the assembly 10 can be used for instance to mount kerbs and drive off road without causing damage to the support member 16 which is cushioned by the resilient body 14. The rubber of the body 14 also provides for an improved ride relative to previous runflat assemblies, whilst the support member 16 retains the integrity of the body 14 and provides for prolonged use. The provision of multiple components 12 connected together also allows a user to tighten or loosen the runflat while it is on the wheel. This can facilitate location and removal of a tyre from the wheel.

Figure 11:
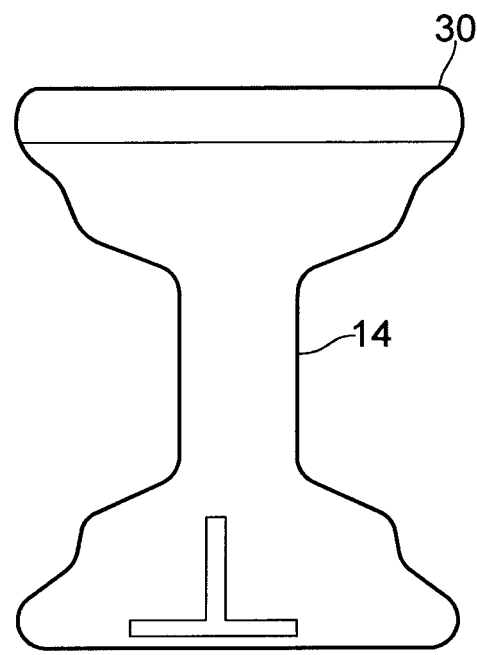
FIG. 11 is a diagrammatic sectional view of a still further runflat assembly according to the invention.
Figure 12:
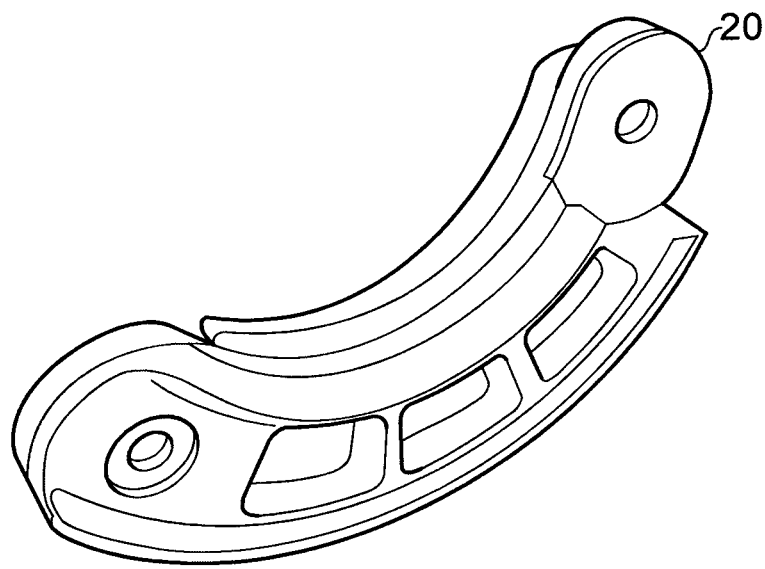
FIG. 12 is a diagrammatic perspective view of a further part of the assembly of FIG. 11.

In a further embodiment of the invention, different parts of the rubber body 14 are made of any of C779, M059 and M049 rubber compounds, as shown in FIGS. 11 and 12. For instance, the circumferential surface 30 may be formed of M059 rubber compound, to a depth 80 of approximately 10 to 15 mm. The rest of the body 14 may be formed of rubber compound C779. This combination of materials provides the assembly with superior shock absorption properties when compared to an apparatus formed entirely of rubber compound C779. In addition, an approximately 3 to 5 mm thick layer of rubber compound M049 may be provided on the surface of the recess 20.

Figure 8:
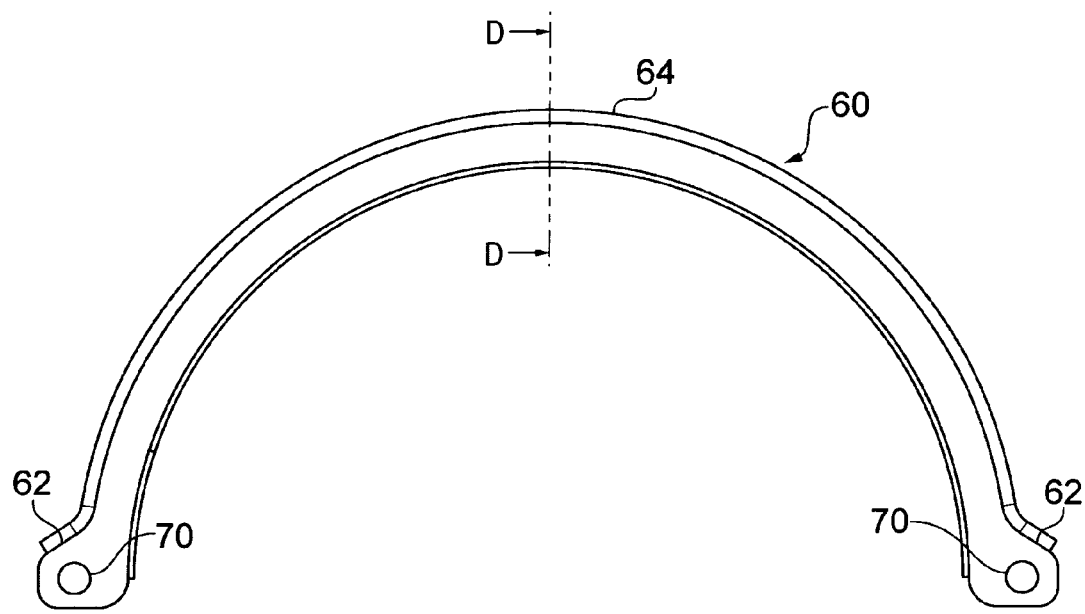
FIG. 8 is a diagrammatic side view of a component of a further runflat assembly according to the invention.
Figure 9:
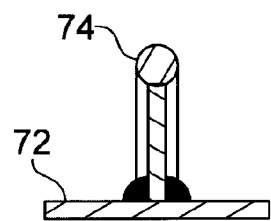
FIG. 9 is a diagrammatic sectional view along the line D to D of FIG. 8.
Figure 10:
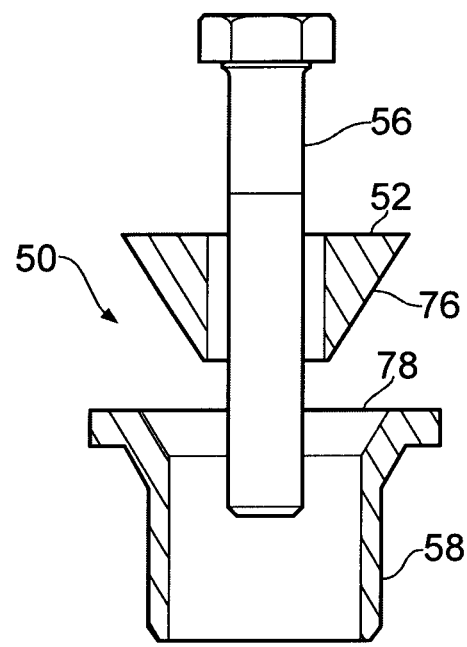
FIG. 10 is a diagrammatic sectional view of a fastening means according to the invention.

FIGS. 8 and 9 show an alternative low profile support member 60. This component has substantially the same function as the support member 16 described in the first embodiment. However the low profile support member 60 has a lower profile mid section 64 relative to the end parts 62, such that the beam extends radially outwardly to a lesser degree relative to the end parts 62. Holes 70 are provided at each end part, which align with the holes 28, in a similar manner to the support member 16. A large internal circumferential flange 72 and a smaller external circumferential flange 74 are provided at the upper and lower ends of the low profile support 60. The low profile support member 60 provides a weight saving advantage in comparison to the support member 16.

It is to be realised that a number of other modifications may be made without departing from the scope of the invention. For instance, the assembly could be provided with only two components, and particularly for use with smaller wheels. For very large wheels it may be that more than three components are required.

Where a split rim wheel is used, the rubber body may be configured to engage with the edges of a tyre to substantially lock the bead of the tyre to the flange of the wheel.

Alternative materials such as Kevlar or carbon fibre could be used for the support member. Different fastening means and/or connection arrangements may be used. The body and/or support member may have a different shape. The size and/or shape of the assembly will depend on the size of tyre fitted to the vehicle.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A runflat assembly, the assembly comprising a plurality of arcuate section parts interconnectable together into an annular configuration to fit around a vehicle wheel, each part including a body of a resilient material, with a single substantially rigid support member located entirely within the body, the support member being in the form of a substantially annular ring, in which one or more circumferential flanges is provided on the ring.

2. A runflat assembly according to claim 1, in which the support member extends in an arcuate manner within the body, such that when mounted on a wheel the support member in the arcuate parts defines a support ring around the wheel.

3. A runflat assembly according to claim 1, in which a connecting arrangement is provided on each end of the arcuate parts to permit interconnection to other arcuate parts, with the connecting arrangements including overlapping connecting members on each part, and with a connecting member on one end of each part overlapping on an opposite side to the connecting member on the other end of each part.

4. A runflat assembly according to claim 3, in which each connecting member has a part circular end, which locates substantially against a recess in an adjacent part which has a part circular end such that the connecting members can be pivoted relative to each other.

5. A runflat assembly according to claim 3, in which alignable holes are provided in overlapping connecting members and a fastening means is extendable through the connecting parts to hold the two members together, and the fastening means may include a nut and bolt.

6. A runflat assembly according to claim 5, in which each connecting member has a part circular end, which locates substantially against a recess in an adjacent part which has a part circular end such that the connecting members can be pivoted relative to each other, and the alignable holes are substantially coaxial with the part circular ends of the connecting members and recesses.

7. A runflat assembly according to claim 5, in which the fastening means includes a sleeve member with a through passage which extends through the alignable holes, a washer, the washer being locatable in the sleeve member through passage, with the bolt being extendable through a passage in the washer.

8. A runflat assembly according to claim 7, in which the washer and sleeve member through passage are frusto conical with respective contact surfaces.

9. A runflat assembly according to claim 3, in which the support members extend into the connecting arrangements.

10. A runflat assembly according to claim 1, in which the support member has a connecting form at each end such that at their ends the support members on adjacent parts overlap each other.

11. A runflat assembly according to claim 1, in which one or more cutouts are provided in the support member to provide weight reduction.

12. A runflat assembly according to claim 1, in which the support member is made of any of steel, Kevlar.

13. A runflat assembly according to claim 1, in which recesses are provided extending into the body to provide weight reduction.

14. A runflat assembly according to claim 1, in which the assembly body includes a flame retardant.

15. A runflat assembly according to claim 1, in which lubricating material is provided on the circumferential outer surface of the assembly and/or on the connections between the interconnectable parts, and the lubricating material is such that in normal operation of a wheel incorporating the assembly the material will be solid, but when a tyre or the ground contacts the assembly due to deflation of the tyre, and/or the temperature rises, the lubricant will tend to liquify.

16. A wheel assembly, the assembly comprising a wheel, a runflat assembly according to claim 1 mounted around the wheel, and a tyre mounted around the runflat assembly, and the tyre may be mounted such that an interior surface of the tyre engages with the runflat assembly.

17. A runflat assembly the assembly comprising a plurality of arcuate section parts interconnectable together into an annular configuration to fit around a vehicle wheel, each part including a body of a resilient material, with a single substantially rigid support member located entirely within the body, the support member being in the form of a substantially annular ring, and in which one or more circumferential flanges is provided on the ring, and the ring having a substantially I shaped cross section.

18. A runflat assembly, the assembly comprising a plurality of arcuate section parts interconnectable together into an annular configuration to fit around a vehicle wheel, each part including a body of a resilient material, with a single substantially rigid support member located entirely within the body, the support member being in the form of a substantially annular ring, and in which a central part of the support member in each arcuate part is of reduced radial extent relative to the support member at end parts of the arcuate part, the central part of the support member having an inner circumferential flange, and an outer circumferential flange.

19. A runflat assembly, the assembly comprising a plurality of arcuate section parts interconnectable to ether into an annular configuration to fit around a vehicle wheel, each part including a body of a resilient material, with a single substantially rigid support member located entirely within the body, the assembly body being made of any of rubber, natural rubber, M049, M059 or C779 rubber compounds or a combination of an thereof, or polyurethane and in which the assembly body is made of rubber, and different parts of the assembly body are of different rubber compounds.

* * * * *

UNITED STATES PATENT AND TRADEMARK OFFICE
CERTIFICATE OF CORRECTION

PATENT NO. : 8,733,413 B2
APPLICATION NO. : 12/734949
DATED : May 27, 2014
INVENTOR(S) : Glazebrook Page 1 of 1

It is certified that error appears in the above-identified patent and that said Letters Patent is hereby corrected as shown below:

In the Claims

Claim 19, Column 6, line 37   delete "to ether" and insert --together--.

Claim 19, Column 6, line 43   delete "an" and insert --any--.

Signed and Sealed this
Nineteenth Day of August, 2014

Michelle K. Lee
*Deputy Director of the United States Patent and Trademark Office*